US010519927B2

(12) United States Patent
Tobin et al.

(10) Patent No.: US 10,519,927 B2
(45) Date of Patent: Dec. 31, 2019

(54) SHEAR WEB FOR A WIND TURBINE ROTOR BLADE

(71) Applicant: General Electric Company, Schenectady, NY (US)

(72) Inventors: James Robert Tobin, Simpsonville, SC (US); Aaron A. Yarbrough, Greenville, SC (US); Daniel Alan Hynum, Simpsonville, SC (US); Christopher Daniel Caruso, Greenville, SC (US)

(73) Assignee: General Electric Company, Schenectady, NY (US)

(*) Notice: Subject to any disclaimer, the term of this patent is extended or adjusted under 35 U.S.C. 154(b) by 290 days.

(21) Appl. No.: 15/437,027

(22) Filed: Feb. 20, 2017

(65) Prior Publication Data

US 2018/0238301 A1 Aug. 23, 2018

(51) Int. Cl.
*F03D 1/06* (2006.01)
*B29D 99/00* (2010.01)

(52) U.S. Cl.
CPC ....... *F03D 1/0675* (2013.01); *B29D 99/0028* (2013.01); *F03D 1/065* (2013.01); *F03D 1/0683* (2013.01); *F05B 2230/60* (2013.01); *F05B 2240/221* (2013.01); *F05B 2280/4002* (2013.01); *Y02E 10/721* (2013.01); *Y02P 70/523* (2015.11)

(58) Field of Classification Search
CPC ....... F03D 1/0675; F03D 1/0683; F03D 1/065
See application file for complete search history.

(56) References Cited

U.S. PATENT DOCUMENTS

| 2,503,450 A | 4/1950 | Nebesar |
| 5,026,447 A | 6/1991 | O'Connor |
| 5,401,138 A | 3/1995 | Mosiewicz |
| 5,476,704 A | 12/1995 | Kohler |
| 5,556,496 A | 9/1996 | Sumerak |
| 6,513,757 B1 | 2/2003 | Amaoka et al. |

(Continued)

FOREIGN PATENT DOCUMENTS

| WO | WO-2013037466 A1 * | 3/2013 | ........... B29C 70/086 |
| WO | WO 2016/189051 A1 | 12/2016 | |
| WO | WO-2018149526 A1 * | 8/2018 | ........... F03D 1/0675 |

OTHER PUBLICATIONS

WO2013037466—Translation and original from Espacenet.*

(Continued)

*Primary Examiner* — Carlos A Rivera
*Assistant Examiner* — Behnoush Haghighian
(74) *Attorney, Agent, or Firm* — Dority & Manning, P.A.

(57) ABSTRACT

The present disclosure is directed to a shear web for a rotor blade of a wind turbine and a method of manufacturing and assembling same. The rotor blade generally includes an upper shell member having an upper spar cap configured on an internal surface thereof and a lower shell member having a lower spar cap configured on an internal surface thereof. Further, the shear web extends between the spar caps along a longitudinal length of the blade. In addition, the shear web includes first and second outer pultruded layers at least partially encompassing a core material, wherein end portions of the first and second outer pultruded layers form compressed flanges at opposing ends of the shear web.

10 Claims, 11 Drawing Sheets

(56) References Cited

U.S. PATENT DOCUMENTS

| | | |
|---|---|---|
| 6,520,706 B1 | 2/2003 | McKague, Jr. et al. |
| 6,800,956 B2 | 10/2004 | Bartlett |
| 6,863,767 B2 | 3/2005 | Bersuch et al. |
| 6,872,343 B2 | 3/2005 | Edwards et al. |
| 6,964,723 B2 | 11/2005 | Lindsay et al. |
| 7,037,568 B1 | 5/2006 | Rogers et al. |
| 7,093,359 B2 | 8/2006 | Morrison et al. |
| 7,179,059 B2 | 2/2007 | Sorensen et al. |
| 7,244,487 B2 | 7/2007 | Brantley et al. |
| 7,258,828 B2 | 8/2007 | Fish |
| 7,371,304 B2 | 5/2008 | Christman et al. |
| 7,393,488 B2 | 7/2008 | Grose et al. |
| 7,625,623 B2 | 12/2009 | Grose et al. |
| 7,726,943 B2 | 6/2010 | Stommel |
| 7,810,757 B2 | 10/2010 | Kirkwood et al. |
| 7,841,835 B2 | 11/2010 | Bagepalli et al. |
| 7,854,594 B2 | 12/2010 | Judge |
| 7,895,745 B2 | 3/2011 | Althoff et al. |
| 7,897,095 B2 | 3/2011 | Raeckers |
| 8,075,275 B2 | 12/2011 | Althoff et al. |
| 8,123,515 B2 | 2/2012 | Schleelein |
| 8,167,569 B2 * | 5/2012 | Livingston ............ F03D 1/0675 416/1 |
| 8,177,514 B2 | 5/2012 | Hibbard |
| 8,191,255 B2 * | 6/2012 | Kristensen ............ F03D 80/30 29/889.71 |
| 8,235,671 B2 | 8/2012 | Yarbrough |
| 8,257,048 B2 | 9/2012 | Yarbrough |
| 8,262,362 B2 | 9/2012 | Yarbrough |
| 8,393,871 B2 * | 3/2013 | Yarbrough ............ F03D 1/065 416/226 |
| 8,807,952 B2 * | 8/2014 | Drewes ................ F03D 1/0675 416/224 |
| 8,807,953 B2 | 8/2014 | Jensen |
| 8,807,954 B2 | 8/2014 | Gill |
| 9,016,551 B2 * | 4/2015 | Kirkwood ............ B23K 31/00 228/173.6 |
| 9,506,452 B2 * | 11/2016 | Bakhuis ............... F03D 1/0675 |
| 9,745,954 B2 * | 8/2017 | Noronha ............... F03D 1/0675 |
| 10,006,436 B2 * | 6/2018 | Caruso ................ F03D 1/0675 |
| 2006/0225278 A1 | 10/2006 | Lin et al. |
| 2007/0036659 A1 | 2/2007 | Hibbard |
| 2011/0008175 A1 | 1/2011 | Gau |
| 2011/0036495 A1 | 2/2011 | Cinquin |
| 2011/0045275 A1 * | 2/2011 | Tadepalli ............... C03C 13/00 428/300.1 |
| 2011/0176928 A1 | 7/2011 | Jensen |
| 2011/0229333 A1 | 9/2011 | Flach |
| 2012/0027612 A1 | 2/2012 | Yarbrough |
| 2012/0027615 A1 | 2/2012 | Irizarry-Rosado et al. |
| 2012/0067515 A1 * | 3/2012 | Dahl .................... B29C 70/467 156/245 |
| 2014/0322025 A1 * | 10/2014 | Barnhart ................ F01D 5/147 416/241 R |
| 2015/0023799 A1 * | 1/2015 | Wetzel ................ F03D 1/0675 416/226 |
| 2015/0316026 A1 | 11/2015 | Noronha et al. |
| 2016/0177918 A1 * | 6/2016 | Caruso ................ F03D 1/0675 416/226 |
| 2016/0195062 A1 * | 7/2016 | Marcoe ................ F03D 1/0675 416/241 A |
| 2016/0245264 A1 * | 8/2016 | Sogaard ................ F03D 80/30 |
| 2016/0257058 A1 | 9/2016 | Johnson et al. |
| 2016/0257059 A1 | 9/2016 | Johnson et al. |
| 2016/0257080 A1 | 9/2016 | Johnson et al. |
| 2016/0290314 A1 * | 10/2016 | Sorensen ............. F03D 1/0633 |
| 2016/0361879 A1 | 12/2016 | Johnson et al. |
| 2017/0021575 A1 * | 1/2017 | Hansen ................ F03D 1/0675 |
| 2017/0058867 A1 * | 3/2017 | Yarbrough ............ F03D 1/0675 |
| 2017/0058868 A1 * | 3/2017 | Caruso ................ F03D 1/0683 |
| 2017/0067439 A1 * | 3/2017 | Yarbrough ............ F03D 1/0675 |
| 2017/0268479 A1 * | 9/2017 | Caruso ................ F03D 1/0675 |
| 2017/0361546 A1 * | 12/2017 | Zhang .................. B32B 5/12 |

OTHER PUBLICATIONS

Technology to manufacture large structures made of fiber reinforced thermoplastics, Introduction CORNET and IraSME, Sirris, Berlin, Jun. 11, 2015, pp. 1-13.

PCT Search Report, dated Jan. 29, 2019.

* cited by examiner

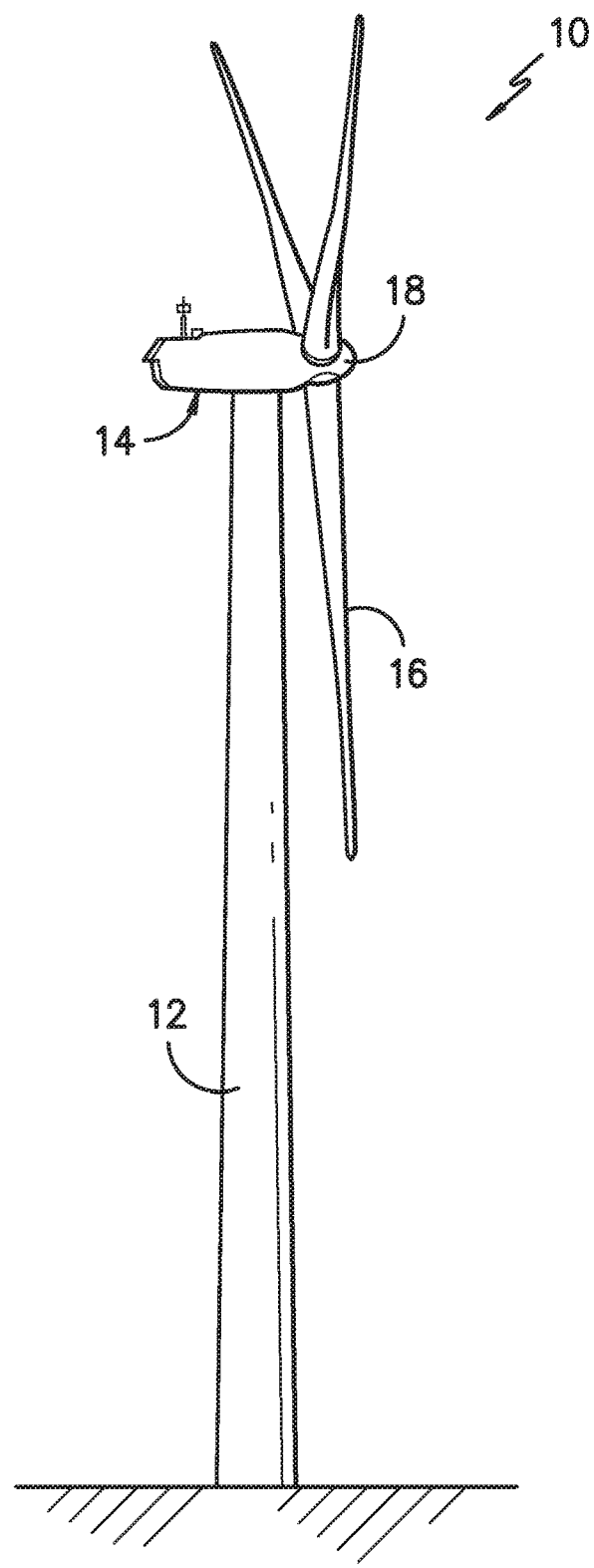
FIG. -1-

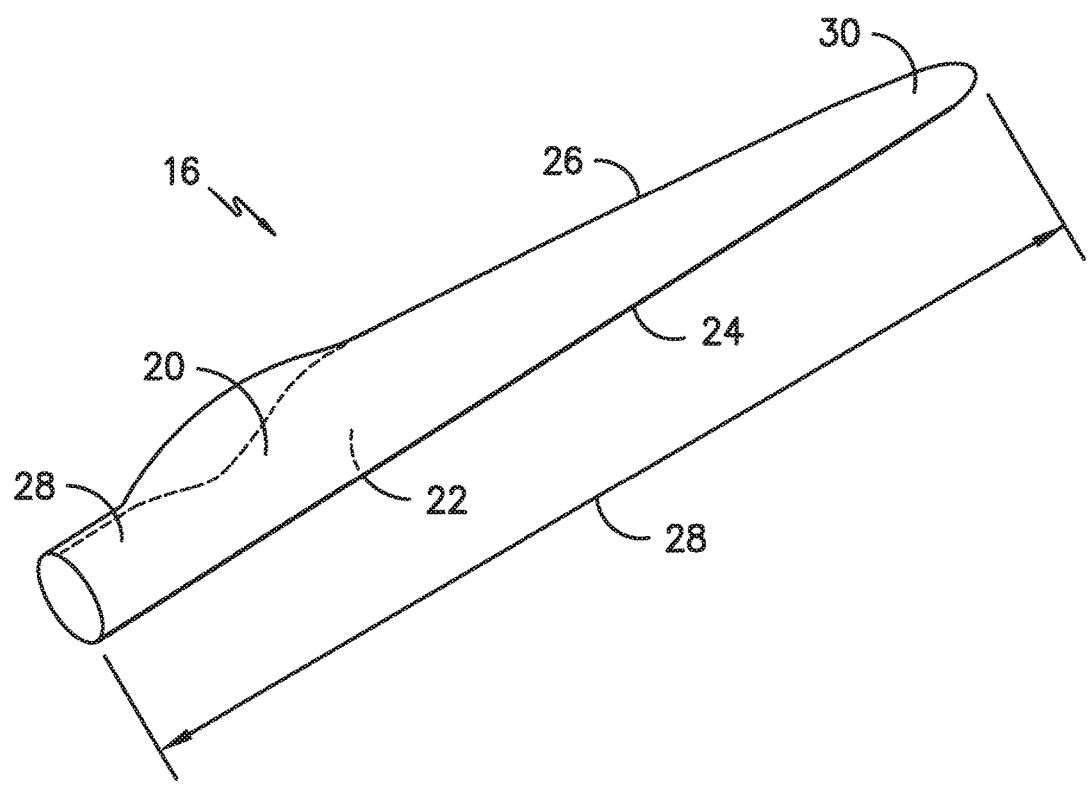
FIG. -2-

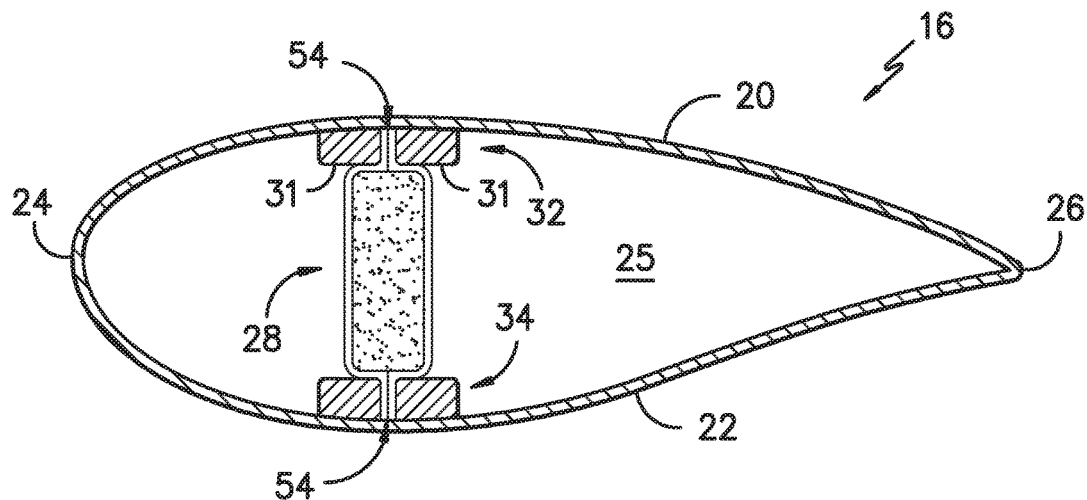
FIG. -3-
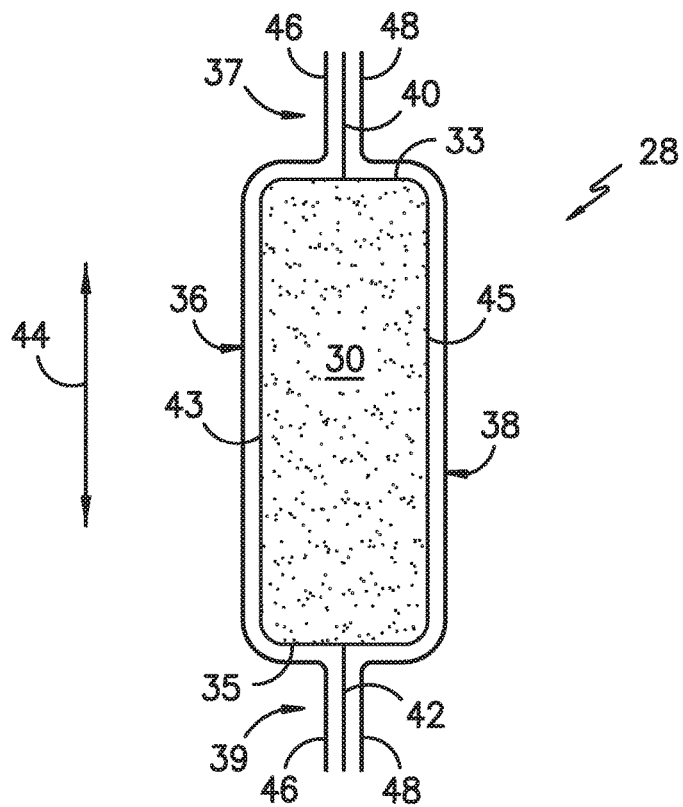
FIG. -4-

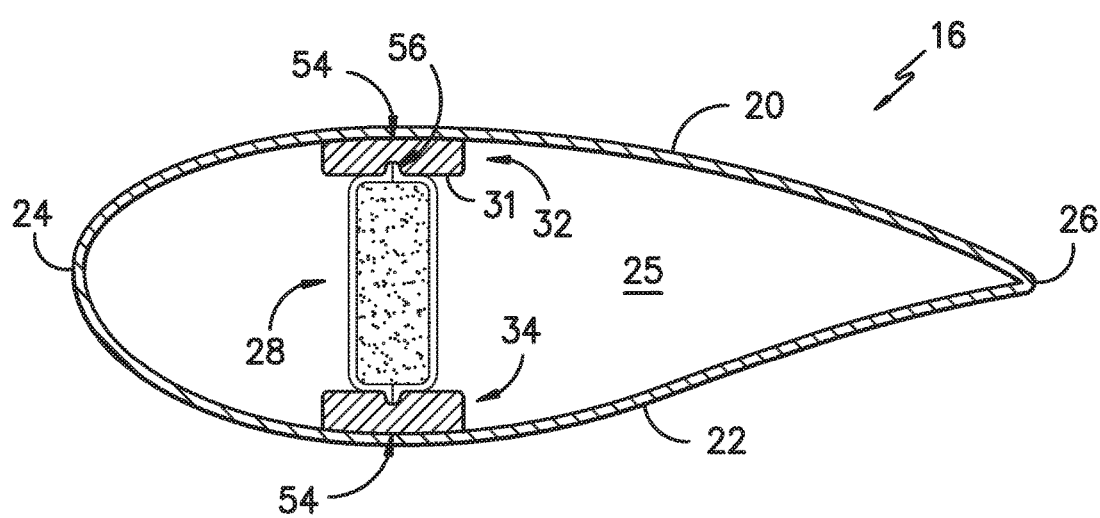
FIG. -5-

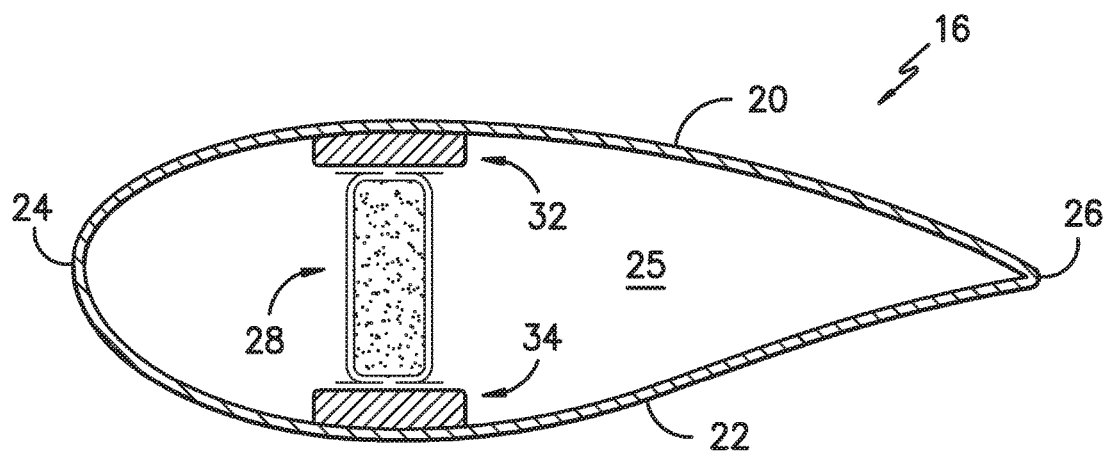
FIG. -6-
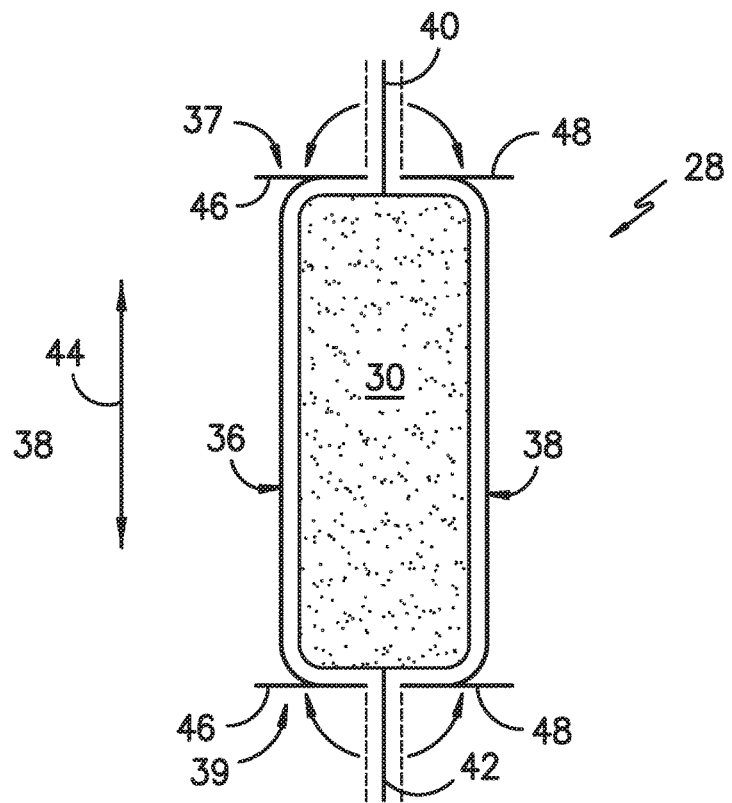
FIG. -7-

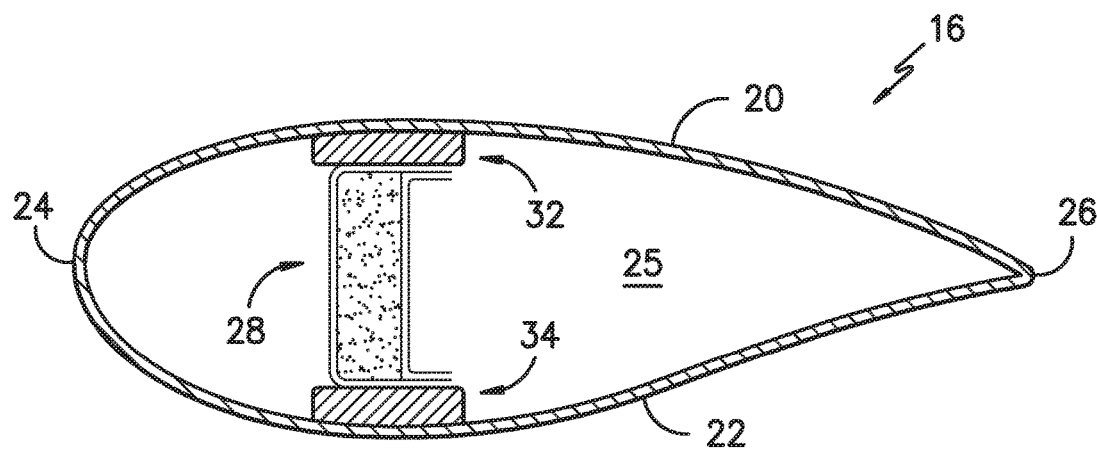
FIG. -8-
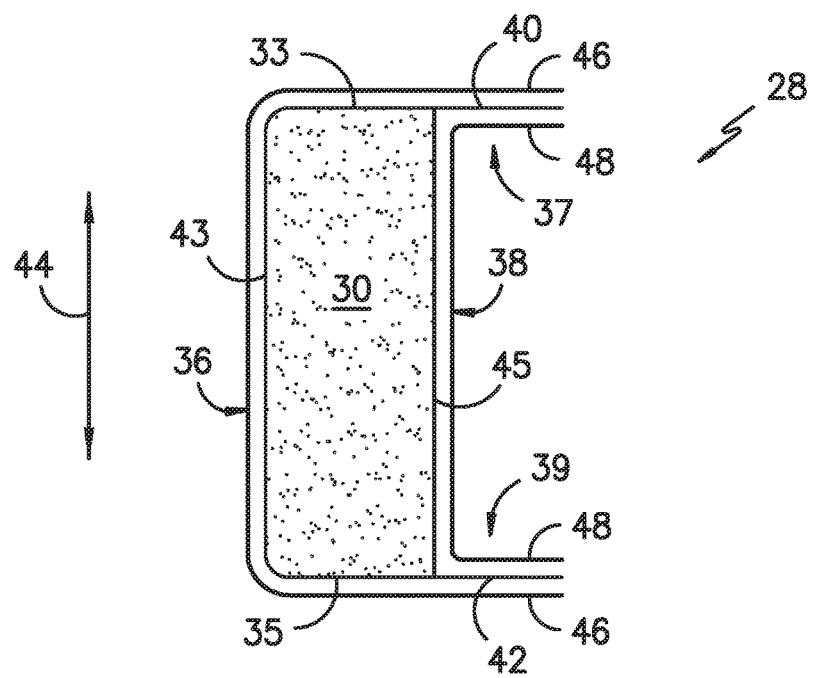
FIG. -9-

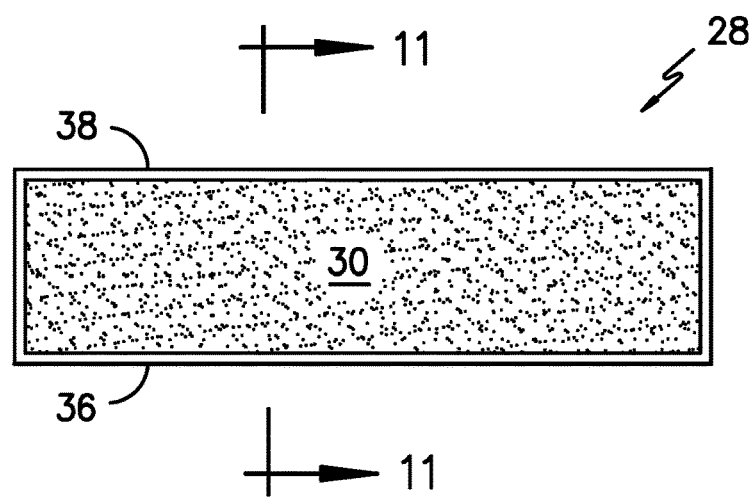
FIG. -10-
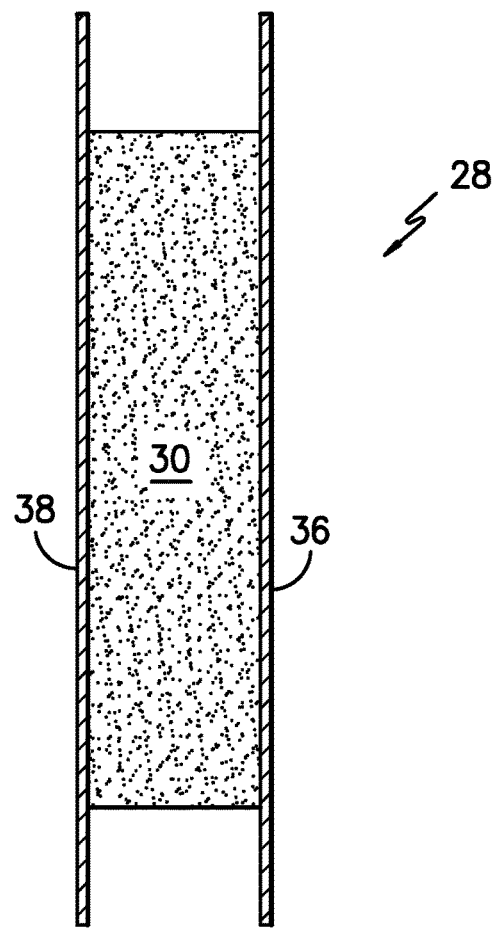
FIG. -11-

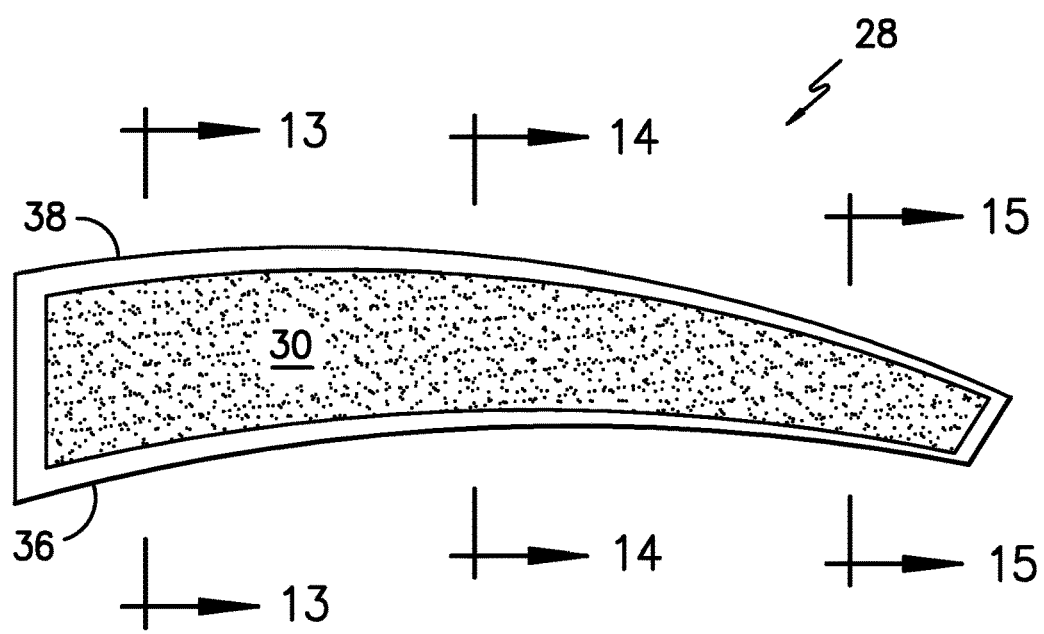
FIG. -12-
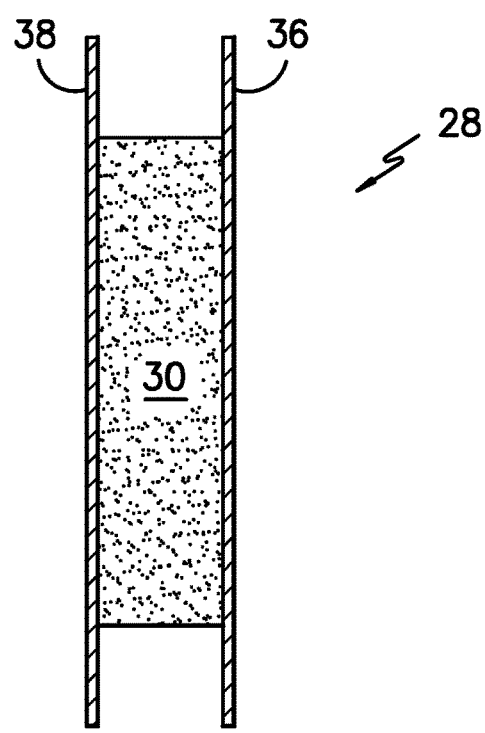
FIG. -13-

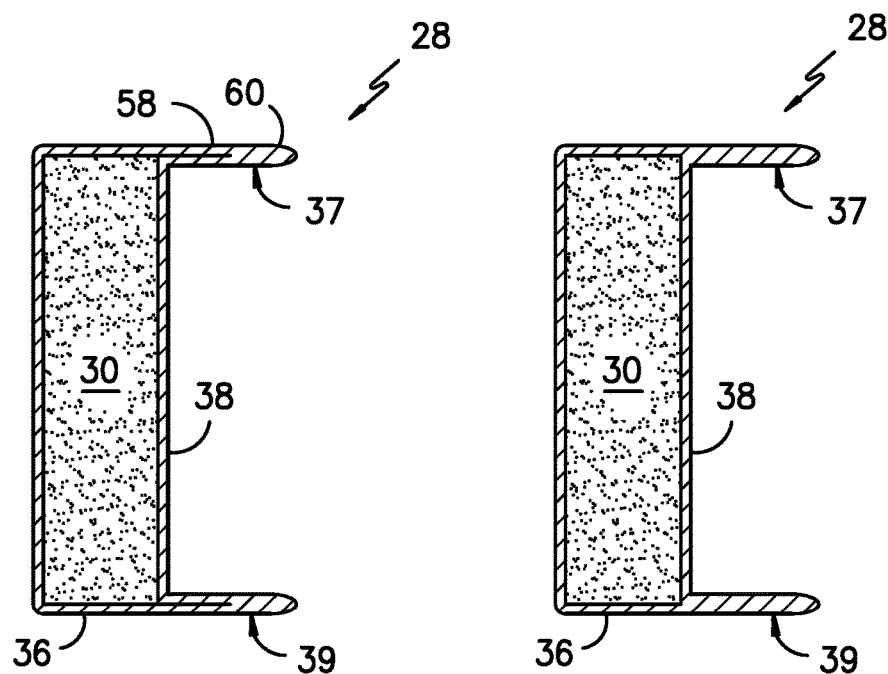
FIG. -14-   FIG. -15-
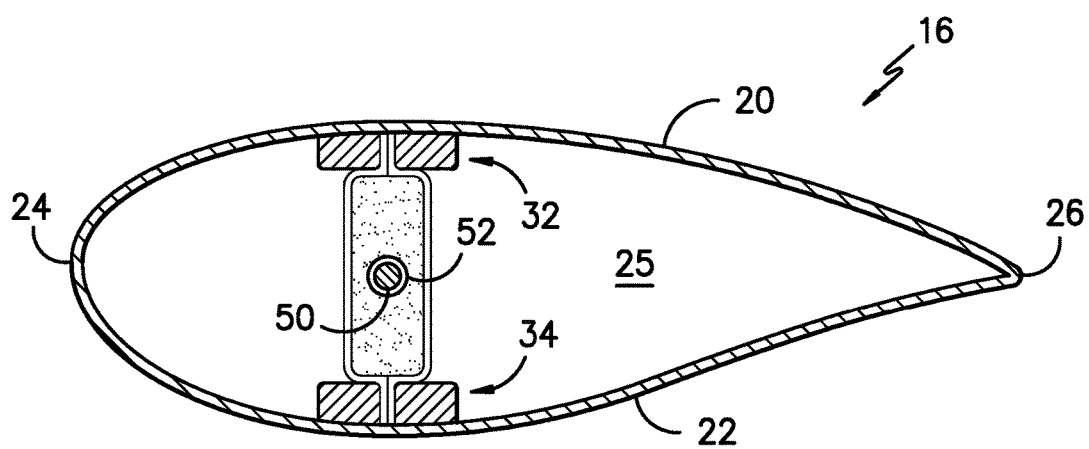
FIG. -16-

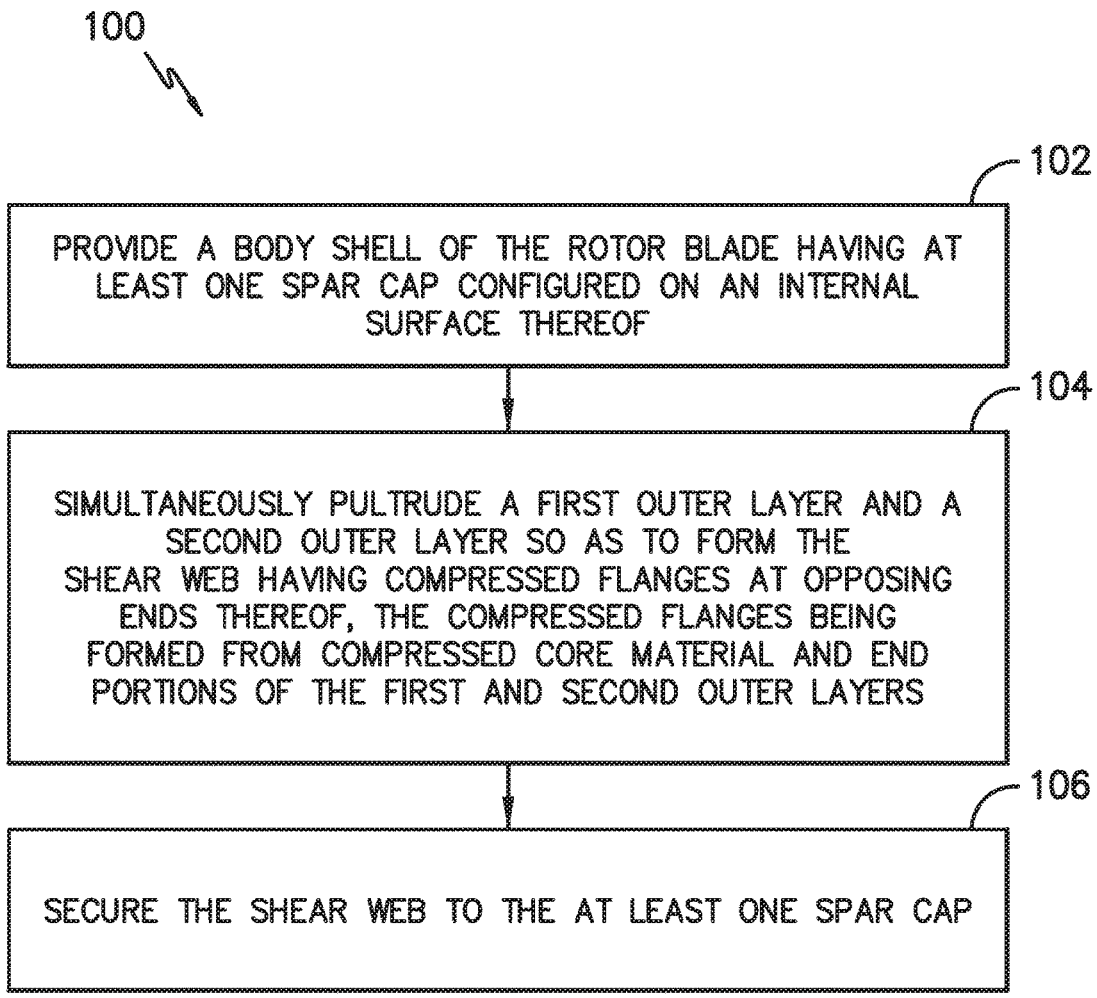
FIG. -17-

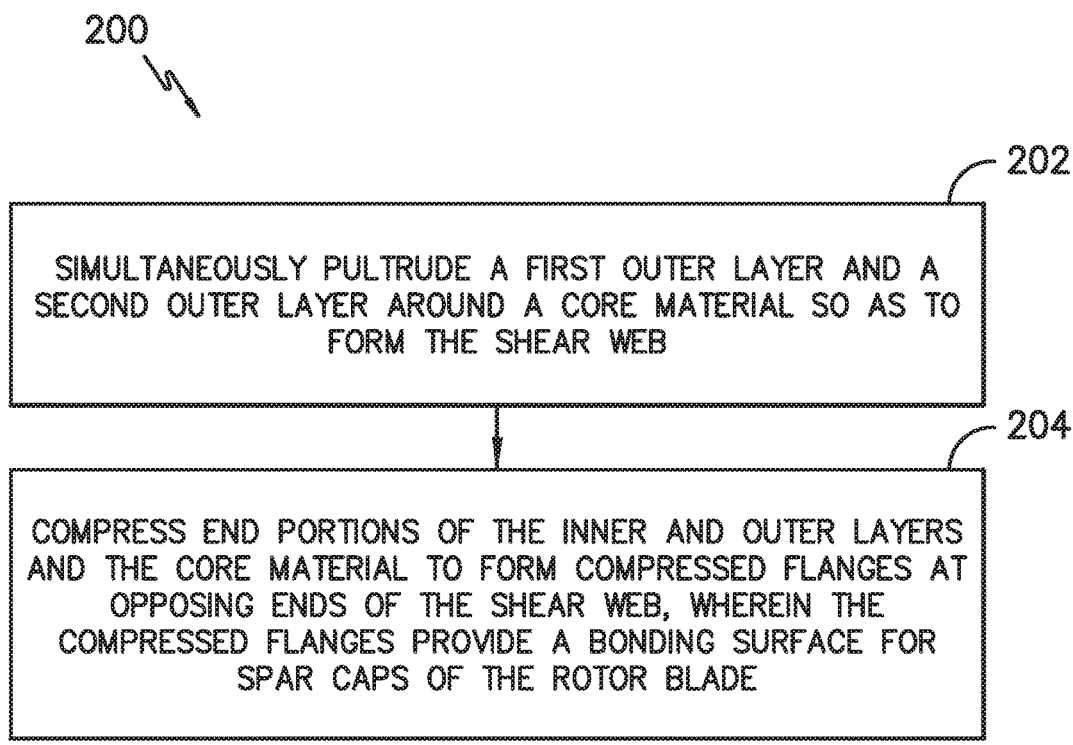
FIG. -18-

SHEAR WEB FOR A WIND TURBINE ROTOR BLADE

FIELD OF THE INVENTION

The present invention relates generally to the field of wind turbines, and more particularly to a pultruded shear web for wind turbine rotor blades.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades are the primary elements for converting wind energy into electrical energy. The blades have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is geared to the generator for producing electricity.

The rotor blades typically consist of a suction side shell and a pressure side shell that are bonded together at bond lines along the leading and trailing edges of the rotor blade. An internal shear web extends between the pressure and suction side shell members and is bonded to spar caps affixed to the inner faces of the shell members. Relatively exact length dimensions are required for the shear web to span between the spar caps and achieve a bond between the spar caps and shear web having sufficient width and thickness dimensions. Achieving these dimensions, as well as an adequate bond, can be difficult and the juncture between the spar caps and shear web is a time-consuming and tedious process that often requires significant re-work. In addition, there is often a minimal bonding surface between the spar caps and the shear web.

In addition, conventional shear webs are constructed using reinforced laminate composite materials formed, for example, via vacuum infusion. Though such materials provide the desired strength and/or stiffness for the component, such materials can add additional weight to the wind turbine.

Accordingly, the industry would benefit from an improved shear web that addresses one or more of the deficiencies of certain conventional configurations.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a rotor blade assembly for a wind turbine. The rotor blade assembly includes an upper shell member having an upper spar cap configured on an internal surface thereof and a lower shell member having a lower spar cap configured on an internal surface thereof. Further, the rotor blade assembly includes a shear web extending between the spar caps along a longitudinal length of the blade. In addition, the shear web includes first and second outer pultruded layers. Moreover, end portions of the first and second outer pultruded layers form compressed flanges at opposing ends of the shear web that are bonded to the upper and lower spar caps.

In one embodiment, the compressed flanges extend generally parallel to a length-wise axis of the shear web. In another embodiment, the upper and lower spar caps may be split into two spar cap components and separated by a gap. In such an embodiment, the compressed flanges may be bonded within the gap of each of the spar caps, respectively. In yet another embodiment, the compressed flanges may be bonded within a groove of each of the spar caps, respectively. Alternatively, the compressed flanges may simply be bonded to an outer-most surface of the spar caps.

In additional embodiments, the first and second outer pultruded layers may at least partially encompass a core material. As such, in one embodiment, the compressed flanges may include regions containing the core material and regions without the core material. In addition, in certain embodiments, the compressed flanges may extend from one side of the core material generally perpendicular to a length-wise axis of the shear web. Alternatively, the compressed flanges may extend from opposing sides of the core material in a generally perpendicular direction with respect to the length-wise axis of the shear web. For example, in one embodiment, the end portions of the first and second outer pultruded layers may be split or separated and bent towards the core material to form the compressed flanges that can extend from opposing sides of the core material.

In additional embodiments, the rotor blade assembly may also include an adhesive configured at the interfaces between the compressed flanges and the spar caps. For example, in certain embodiments, the adhesive may include one of or a combination of the following: a bond paste, a binder, a tape, a gum, a wax, a plaster, a grout, a resin, an epoxy, a sealant, glue, or similar.

In another embodiment, the first and second outer pultruded layers may be constructed, at least in part, of a reinforced composite laminate material. For example, in one embodiment, the reinforced composite laminate material may include a thermoplastic material. In further embodiments, the core material may be constructed, at least in part, of at least one of foam, cork, composites, or balsa wood.

In further embodiments, the shear web may also include a channel (e.g. located in the core material) that is configured to receive one or more cables, such as a down conductor cable of a lightning protection system.

In another aspect, the present disclosure is directed to a method for assembling a shear web in a rotor blade of a wind turbine. The method includes providing a body shell of the rotor blade having at least one spar cap configured on an internal surface thereof. The method also includes simultaneously pultruding, e.g. via three-dimensional (3D) pultrusion, a first outer layer and a second outer layer so as to form the shear web having compressed flanges at opposing ends thereof. As such, the compressed flanges are formed from end portions of the first and second outer pultruded layers. In addition, the method includes securing the pultruded shear web to the at least one spar cap via the compressed flanges.

In one embodiment, the method may include inserting at least one of compressed core material or an additional sheet of material between the end portions of the first and second outer layers such that the end portions do not bond together when the compressed flanges are formed. In another embodiment, the method includes subsequently heating the end portions of the first and second outer layers, separating the end portions of the first and second outer layers, removing at least one of the additional sheet of material or the compressed core material, bending the end portions against the core material so as to form the compressed flanges, and securing the shear web to the at least one spar cap via the compressed flanges.

In another embodiment, the step of securing the shear web to the at least one spar cap may include bonding the shear web to opposing spar caps via thermoplastic welding, an adhesive, or similar. More specifically, in certain embodiments, the step of bonding the shear web to opposing spar caps may include bonding the compressed flanges of the shear web within a gap of the respective spar caps.

In yet a further embodiment, the method may include subsequently removing the compressed flanges from the shear web and bonding the shear web to the at least one spar cap.

In yet another aspect, the present disclosure is directed to a method for manufacturing a shear web for a rotor blade of a wind turbine. The method includes simultaneously pultruding, e.g. via 3D pultrusion, a first outer layer and a second outer layer around a core material so as to form the shear web. The method also includes compressing end portions of the first and second outer layers and the core material to form compressed flanges at opposing ends of the shear web. As such, the compressed flanges are configured to provide a bonding surface for spar caps of the rotor blade. It should be understood that the shear web may further include any of the additional features as described herein.

In another embodiment, the method may also include separating the end portions of the inner and outer layers such that the separated end portions extend from opposing sides of the core material generally perpendicular to the lengthwise axis of the shear web, wherein the separated end portions form the compressed flanges.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art is set forth in the specification, which makes reference to the appended figures, in which:

FIG. 1 illustrates a perspective view of one embodiment of a wind turbine according to the present disclosure;

FIG. 2 illustrates a perspective view of one embodiment of a rotor blade of a wind turbine according to the present disclosure;

FIG. 3 illustrates a cross-sectional view of one embodiment of a rotor blade assembly of a wind turbine according to the present disclosure, particularly illustrating a shear web with compressed flanges configured between split spar cap components;

FIG. 4 illustrates a cross-sectional view of one embodiment of the shear web of a wind turbine rotor blade according to the present disclosure;

FIG. 5 illustrates a cross-sectional view of another embodiment of a rotor blade assembly of a wind turbine according to the present disclosure, particularly illustrating a shear web with compressed flanges configured within a groove of the spar caps;

FIG. 6 illustrates a cross-sectional view of yet another embodiment of a rotor blade assembly of a wind turbine according to the present disclosure, particularly illustrating a shear web having compressed flanges extending from opposing sides of a core material of the shear web and bonded to opposing spar caps;

FIG. 7 illustrates a cross-sectional view of one embodiment of the shear web of a wind turbine rotor blade according to the present disclosure;

FIG. 8 illustrates a cross-sectional view of still another embodiment of a rotor blade assembly of a wind turbine according to the present disclosure, particularly illustrating a shear web having compressed flanges extending from one side of a core material of the shear web and bonded to opposing spar caps;

FIG. 9 illustrates a cross-sectional view of one embodiment of the shear web of a wind turbine rotor blade according to the present disclosure;

FIG. 10 illustrates a partial, top view of one embodiment of a shear web of a wind turbine rotor blade according to the present disclosure, particularly illustrating a shear web constructed of a core material surrounded by pultruded layers that extend past a width of the core material;

FIG. 11 illustrates a cross-sectional view of the shear web of FIG. 11 along line 11-11;

FIG. 12 illustrates a span-wise, top view of one embodiment of a shear web of a wind turbine rotor blade according to the present disclosure, particularly illustrating a shear web constructed of a core material surrounded by folded pultruded layers that extend past a width of the core material;

FIG. 13 illustrates a cross-sectional view of the shear web of FIG. 12 along line 13-13;

FIG. 14 illustrates a cross-sectional view of the shear web of FIG. 12 along line 14-14;

FIG. 15 illustrates a cross-sectional view of the shear web of FIG. 12 along line 15-15;

FIG. 16 illustrates a cross-sectional view of still another embodiment of a rotor blade assembly of a wind turbine according to the present disclosure, particularly illustrating a shear web having a channel configured within the core material;

FIG. 17 illustrates a flow diagram of one embodiment of a method for assembling a shear web in a rotor blade of a wind turbine; and, FIG. 18 illustrates a flow diagram of one embodiment of a method for manufacturing a shear web for a rotor blade of a wind turbine according to the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention include such modifications and variations as come within the scope of the appended claims and their equivalents.

Generally, the present disclosure is directed to a shear web for a rotor blade of a wind turbine and a method of manufacturing and assembling same. The rotor blade generally includes upper and lower shell members having upper and lower spar caps configured on respective internal surfaces thereof. Further, the shear web extends between the spar caps along a longitudinal length of the blade. In addition, the shear web is formed from first and second outer pultruded layers at least partially encompassing a core material. Further, end portions of the first and second outer pultruded layers and optionally the core material form compressed flanges at opposing ends of the shear web that can be easily bonded or mounted to the upper and lower spar caps. As such, the shear web of the present disclosure can be quickly and easily manufactured so as to provide additional stiffness and/or strength to the rotor blade.

Referring now to the drawings, FIG. 1 illustrates one embodiment of a wind turbine 10 according to the present disclosure. As shown, the wind turbine 10 includes a tower 12 with a nacelle 14 mounted thereon. A plurality of rotor blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

Referring now to FIG. 2, a more detailed view of one of the rotor blades 16 of FIG. 1 is illustrated. As shown, the rotor blade 16 includes an upper shell member 20 and a lower shell member 22. Further, the upper shell member 20 is configured as the suction side surface of the blade 16, while the lower shell member 22 is configured as the pressure side surface of the blade 16. The rotor blade 16 also includes a leading edge 24 and a trailing edge 26, as well as a root portion 28 and a tip portion 30. As is well known in the art, the upper shell member 20 and the lower shell member 22 may be joined together at the leading edge 24 and trailing edge 26 or any other suitable location. The rotor blade 16 also includes an internal cavity 25 (FIG. 3) in which various structural members, such as spar caps 32, 34 and one or more shear webs 30 according to the present disclosure, may be configured.

Referring now to FIGS. 3-10, various cross-sectional views of the shear web 28 of the rotor blade 16 are illustrated that incorporate various aspects of the present invention. More specifically, as shown in FIGS. 3, 6, 8, and 10, the upper shell member 20 contains an upper spar cap 32 configured on an internal surface thereof. Similarly, the lower shell member 22 contains a lower spar cap 34 configured on an internal surface thereof. As such, the shear web 28 extends between the spar caps 32, 34 along a longitudinal length of the blade 16 in a generally span-wise direction. In addition, the cross-section of the shear web 28 may have any suitable shape. For example, as shown, the cross-sectional shape of the shear web 28 may have a generally square or rectangular shape. It should be appreciated, that as used herein, terms of approximation, such as "approximately," "substantially," "generally," or "about," refer to being within a ten percent margin of error.

Further, as shown generally in the figures, the shear web 28 includes at least one outer layer or sheet (e.g. pultruded outer layers 36, 38) at least partially surrounding or encompassing one or more core materials 30. For example, as shown in FIGS. 4-7, the shear web 28 includes a first outer layer 36 and a second outer layer 38 generally encompassing the core material 30. More specifically, as shown in FIG. 4, the first outer layer 36 is configured on a first side of the core material 30 and the second outer layer 38 is configured on a second, opposite side of the core material 30. As such, the first and second outer layers 36, 38 generally correspond to the outer cross-sectional shape of the core material 30. More specifically, as shown in FIGS. 4 and 9, end portions 46, 48 of the first and second outer layers 36, 38 and compressed portions of the core material 30 (i.e. compressed core flanges 40, 42) form compressed flanges 37, 39 of the shear web 28 at opposing ends of the shear web 28 that may be bonded to their respective spar caps 32, 34, which will be discussed in more detail below.

For example, the core material 30 may include one or more compressed flanges 40, 42, i.e. flanges made of compressed core material. More specifically, as shown in FIGS. 4, 7, and 9, the core material 30 may include a first compressed flange 40 and a second compressed flange 42 on an opposite end of the core material 30. Further, in certain embodiments, as shown in FIGS. 4 and 7, the core material flanges 40, 42 may extend from opposing ends 33, 35 of the core material 30 in a direction substantially parallel to a length-wise axis 44 of the core material 30. As such, the compressed flanges 37, 39 of the shear web 28 may also extend generally parallel to the length-wise axis 44 of the shear web 28. Further, as shown, the compressed flanges 37, 39 may extend from the opposing ends 33, 35 substantially at the center of the ends 33, 35 (as shown) or may be located more to the left or right of each of the ends 33, 35.

Alternatively, as shown in FIG. 9, the compressed core material flanges 40, 42 may extend from the opposing ends 33, 35 of the core material 30 in a direction substantially perpendicular to the length-wise axis 44 of the core material 30. In such embodiments, the compressed flanges 37, 39 of the shear web 28 may also extend generally perpendicular to the length-wise axis 44 of the shear web 28. More specifically, as shown in FIGS. 8 and 9, the compressed flanges 37, 39 extend from the same side of the shear web 28. In alternative embodiments, the compressed flanges 37, 39 may extend from opposing sides of the shear web 28, i.e. one from the left side and one from the right side such that the flanges extend in opposite directions with respect to the core material 30.

In certain embodiments, the shear web 28, and more particularly the first and second outer layers 36, 38, may be formed via a pultrusion process. For example, in one embodiment, the shear web 28 may be formed via a two-dimensional (2D) pultrusion process. Alternatively, the shear webs 28 described herein can be quickly and easily formed via 3D pultrusion. In such embodiments, the pultruded shear web 28 may be constructed, at least in part, of a thermoset material or a thermoplastic material. As used herein, the term "pultruded" or similar generally describe reinforced materials (e.g. fibers or woven or braided strands) that are impregnated with a resin (e.g. a thermoset or a thermoplastic polymer) and pulled through a stationary die such that the resin cures or undergoes polymerization. As such, the pultrusion process is typically characterized by a continuous process of composite materials that produces composite parts having a constant cross-section. Further, 3D pultrusion is generally characterized by a manufacturing process similar to 2D pultrusion, but that can accommodate three-dimensional curved profiles. In addition, 3D pultrusion processes can be used to generate pultruded components having a variety of non-linear or variable cross-sectional shapes rather than a constant cross-section.

Further, pultruded components may be constructed of reinforced thermoset or thermoplastic materials. In addition, pultruded components may be produced from rovings, which generally encompass long and narrow bundles of fibers that are not combined until joined by a cured resin.

A thermoplastic material as described herein generally encompasses a plastic material or polymer that is reversible in nature. For example, thermoplastic materials typically become pliable or moldable when heated to a certain temperature and solidify upon cooling. Further, thermoplastic materials may include amorphous thermoplastic materials and/or semi-crystalline thermoplastic materials. For example, some amorphous thermoplastic materials may generally include, but are not limited to, styrenes, vinyls, cellulosics, polyesters, acrylics, polysulphones, and/or imides. More specifically, exemplary amorphous thermoplastic materials may include polystyrene, acrylonitrile butadiene styrene (ABS), polymethyl methacrylate (PMMA), glycolised polyethylene terephthalate (PET-G), polycarbonate, polyvinyl acetate, amorphous polyamide, polyvinyl chlorides (PVC), polyvinylidene chloride, polyurethane, or any other suitable amorphous thermoplastic material. In addition, exemplary semi-crystalline thermoplastic materials may generally include, but are not limited to polyolefins, polyamides, fluropolymer, ethyl-methyl acrylate, polyesters, polycarbonates, and/or acetals. More specifically, exemplary semi-crystalline thermoplastic materials may include polybutylene terephthalate (PBT), polyethylene terephthalate (PET), polypropylene, polyphenyl sulfide, polyethylene, polyamide (nylon), polyetherketone, or any other suitable semi-crystalline thermoplastic material. Further, a thermoset material as described herein generally encompasses a plastic material or polymer that is non-reversible in nature. For example, thermoset materials, once cured, cannot be easily remolded or returned to a liquid state. As such, after initial forming, thermoset materials are generally resistant to heat, corrosion, and/or creep. Example thermoset materials may generally include, but are not limited to, some polyesters, esters, epoxies, or any other suitable thermoset material.

In alternative embodiments, the first and second outer pultruded layers 36, 38 of the shear web 28 may be constructed of a reinforced laminate composite material, plastic, metal, or any other suitable material.

It should also be understood that the core material 30 described herein may be constructed of any suitable materials, including but not limited to low-density foam, cork, composites, balsa wood, composites, or similar. Suitable low-density foam materials may include, but are not limited to, polystyrene foams (e.g., expanded polystyrene foams), polyurethane foams (e.g. polyurethane closed-cell foam), polyethylene terephthalate (PET) foams, other foam rubbers/resin-based foams and various other open cell and closed cell foams.

Referring generally to the figures, the shear web 28 of the present disclosure may be affixed to respective spar caps 32, 34 by any suitable bonding or attachment means. For example, as shown in FIG. 3, each of the spar caps 32, 34 may be split into two spar cap components (e.g. components 31) such that the compressed flanges 37, 39 of the shear web 28 may be directly bonded within the gap 54 located between the respective split spar cap components 31 via an adhesive such as bond paste. In additional embodiments, rather than splitting the spar caps 32, 34, the spar caps 32, 34 may simply include a groove 56 or similar that is configured to receive the compressed flanges 37, 39 as shown in FIG. 5.

Alternatively, as shown in FIGS. 6 and 7, the end portions 46, 48 of the first and second outer pultruded layers 36, 38 may be separated or bent into flanges (as indicated by the arrows) that can be directly bonded to the respective spar caps 32, 34 via an adhesive. In such an embodiment, the first and second flanges 40, 42 of the core material 30 may be removed so as to create a flat flange having a larger bonding surface area that can be easily bonded to the spar caps 32, 34. In still another embodiment, as shown in FIGS. 8 and 9, the compressed flanges 37, 39 of the shear web 28 may extend substantially perpendicular to the length-wise axis 44 of the core material 30. In such an embodiment, the compressed flanges 37, 39 of the shear web 28 may be directly bonded to the respective split spar caps 32, 34, e.g. via an adhesive, without having to remove the first and second flanges 40, 42 of the core material 30 and without having to split the spar caps 32, 34. It should be understood that the adhesive described herein may include one of or a combination of the following: a bond paste, a binder, a tape, a gum, a wax, a plaster, a grout, a resin, an epoxy, a sealant, glue, or similar. In addition, the shear web 28 may be mounted to the spar caps 32, 34 via any other suitable means, such as thermoplastic welding where applicable.

In addition, as shown in FIGS. 8 and 9, the compressed flanges 37, 39 may extend from one side of the core material 30 generally perpendicular to the length-wise axis 44 of the shear web 28. For example, as shown, the compressed flanges 37, 39 both extend from side 45 of the core material 30. In alternative embodiments, as shown in FIGS. 6 and 7, the compressed flanges 37, 39 may extend from opposing sides 43, 45 of the core material 30 generally perpendicular to the length-wise axis 44 of the shear web 28. For example, as mentioned, the end portions 46, 48 of the first and second outer pultruded layers 36, 38 may be separated and bent so as to form compressed flanges 37, 39 that can extend from opposing sides 43, 45 of the core material 30.

Referring now to FIGS. 10-15, the compressed flanges 37, 39 of the shear web 28 may include a region 58 with core material 30 and a region 60 without core material 30. More specifically, as shown, the core material 30 has a fixed width (as described here, width means height in reference to the shear web 28) with the first and second outer pultruded layers 36, 38 on the top and bottom. Further, as shown in FIG. 11, the first and second outer pultruded layers 36, 38 may extend past the width of the core material 30 in either direction or both directions. As shown in FIG. 12, since the shear web 28 tapers in height along the span, the end regions of the core/glass are compressed (FIGS. 13-15); however, some regions of the resulting compressed flanges 37, 39 may contain the pultruded layers 36, 38 and the core material 30 and others only the pultruded layers 36, 38.

Referring now to FIG. 16, the shear web 28 as described herein may also be configured to accommodate one or more cables, such as a down conductor cable 50 of a lightning protection system (not shown) of the wind turbine 10. More specifically, as shown, the shear web 28 may include a channel 52 (e.g. located in the core material 30) that is configured to receive the down conductor cable 50. As such, the down conductor cable 50 or any other suitable cable or wire may be configured within the hollow cross-section of the channel 52. For example, as shown in FIG. 16, the down conductor cable 50 may be inserted into the channel 52 at the blade root portion 28 and pulled through the rotor blade 16 from the blade tip 30. In alternative embodiments, the down conductor cable 50 may be inserted into the channel 52 at the blade tip 30 and pulled through the rotor blade 16 from the blade root portion 28. As such, the down conductor cable 50 can be easily installed, replaced, and/or repaired.

Referring now to FIG. 17, a flow diagram of a method 100 for assembling the shear web 28 of the rotor blade 16 of the wind turbine 10 according to the present disclosure is illustrated. As shown at 102, the method 100 includes providing a body shell of a rotor blade 16 having at least one spar cap 32, 34 configured on an internal surface thereof. In one embodiment, as mentioned, the body shell may include an upper shell member 20 having at least one spar cap 32 configured on an internal surface thereof and a lower shell member 22 having at least one spar cap 34 configured on an internal surface thereof.

As shown at 104, the method 100 includes simultaneously pultruding first and second outer layers 36, 38 around a core material 30 so as to form the shear web 28 having compressed flanges 37, 39 at opposing ends thereof. Further, as shown in FIGS. 4, 7, and 9, the compressed flanges 37, 39 may be formed from compressed core material 40, 42 and end portions 46, 48 of the first and second outer layers 36, 38. In addition, as shown at 106, the method 100 includes securing the shear web 28 to at least one spar cap via the compressed flanges 37, 39. For example, in one embodiment, the method 100 may include bonding the shear web 28 between the opposing spar caps 32, 34 via at least one of an adhesive. More specifically, in certain embodiments as shown in FIG. 3, the step of bonding the shear web 28 to opposing spar caps 32, 34 may include bonding the compressed flanges 37, 39 of the shear web within a gap of the respective spar caps 32, 34.

In further embodiments, as shown in FIG. 7, the method 100 may further include separating and bending the end portions 46, 48 of the first and second outer layers 36, 38 and removing the compressed core material (i.e. flanges 40, 42) so as to form the compressed flanges 37, 39. More specifically, in one embodiment, the end portions 46, 48 may be subsequently heated such that the portions 46, 48 can be easily formed into the compressed flanges 37, 39.

Referring now to FIG. 18, a flow diagram of a method 200 for manufacturing the shear web 28 of the rotor blade 16 of the wind turbine 10 according to the present disclosure is illustrated. As shown at 202, the method 200 includes simultaneously pultruding first and second outer layers 36, 38 around a core material 30 so as to form the shear web 28. As shown at 204, the method 200 also includes compressing end portions 46, 48 of the first and second outer layers 36, 38 and the core material 30 to form compressed flanges 37, 39 at opposing ends of the shear web 28. As such, the compressed flanges 37, 39 are configured to provide a bonding surface for the spar caps 32, 34 of the rotor blade 16.

While the present subject matter has been described in detail with respect to specific exemplary embodiments and methods thereof, it will be appreciated that those skilled in the art, upon attaining an understanding of the foregoing, may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A rotor blade assembly for a wind turbine, comprising:
   an upper shell member having at least one upper spar cap configured on an internal surface thereof;
   a lower shell member having at least one lower spar cap configured on an internal surface thereof; and,
   a shear web extending between the spar caps along a longitudinal length of the rotor blade, the shear web comprising a core material and first and second outer pultruded layers that at least partially encompass the core material,
   wherein end portions of the first and second outer pultruded layers form chord-wise extending flanges at opposing ends of the shear web that are bonded to the upper and lower spar caps, the flanges comprising portions of the core material and the first and second outer pultruded layers.

2. The rotor blade assembly of claim 1, wherein the flanges extend parallel to a length-wise axis of the shear web.

3. The rotor blade assembly of claim 2, wherein the upper and lower spar caps comprise two spar cap components separated by a gap, the flanges being bonded within the gap of each of the spar caps, respectively.

4. The rotor blade assembly of claim 1, wherein the flanges comprise regions containing the core material and regions without the core material.

5. The rotor blade assembly of claim 1, wherein the flanges extend from the opposing ends of the core material in the same direction along a chord-wise axis.

6. The rotor blade assembly of claim 1, wherein the flanges extend from the opposing ends of the core material in opposite directions along a chord-wise axis.

7. The rotor blade assembly of claim 6, wherein the end portions of the first and second outer pultruded layers are separated to form the flanges.

8. The rotor blade assembly of claim 1, further comprising an adhesive configured at interfaces between the flanges and the spar caps, wherein the adhesive comprises one of or a combination of the following: a bond paste, a binder, a tape, a gum, a wax, a plaster, a grout, a resin, an epoxy, a sealant, or glue.

9. The rotor blade assembly of claim 1, wherein the first and second outer pultruded layers are constructed, at least in part, of a reinforced composite laminate material, wherein the reinforced composite laminate material comprises a thermoplastic material.

10. The rotor blade assembly of claim 1, wherein the shear web further comprises a channel.

* * * * *